US008533191B1

United States Patent
Cohen et al.

(10) Patent No.: US 8,533,191 B1
(45) Date of Patent: Sep. 10, 2013

(54) SYSTEM FOR GENERATING A KEYWORD RANKING REPORT

(75) Inventors: Brandon Cohen, Tenafly, NJ (US); Seth Dotterer, Mohegan Lake, NY (US)

(73) Assignee: Conductor, Inc., New York, NY (US)

( * ) Notice: Subject to any disclaimer, the term of this patent is extended or adjusted under 35 U.S.C. 154(b) by 210 days.

(21) Appl. No.: 12/788,426

(22) Filed: May 27, 2010

(51) Int. Cl.
*G06F 17/30* (2006.01)

(52) U.S. Cl.
USPC .......................................... 707/735

(58) Field of Classification Search
USPC ................................ 707/688, 735
See application file for complete search history.

(56) References Cited

U.S. PATENT DOCUMENTS

| 7,805,428 | B2 * | 9/2010 | Batista Reyes et al. | 707/706 |
| 8,209,320 | B2 * | 6/2012 | Reitter et al. | 707/709 |
| 2003/0046389 | A1 * | 3/2003 | Thieme | 709/224 |
| 2006/0026147 | A1 * | 2/2006 | Cone et al. | 707/3 |
| 2007/0129997 | A1 * | 6/2007 | Davies | 705/14 |
| 2008/0071766 | A1 * | 3/2008 | Grieselhuber et al. | 707/5 |
| 2008/0071767 | A1 * | 3/2008 | Grieselhuber et al. | 707/5 |
| 2010/0057717 | A1 * | 3/2010 | Kulkarni | 707/5 |

OTHER PUBLICATIONS

Rank Checker, crawled by the Internet Archive's Wayback Machine on Apr. 27, 2009, pp. 1-12.*
Joost de Valk, "Rankings That Make Sense", posted Dec. 7, 2009, Yoast.com, pp. 1-2.*
Lee Ka Hoong, "Outrank Your Competitors with SEO Rank Monitor", posted Dec. 11, 2009, Myblog2day.com, pp. 1-5.*

* cited by examiner

*Primary Examiner* — Rehana Perveen
*Assistant Examiner* — Scott A Waldron
(74) *Attorney, Agent, or Firm* — Moritt Hock & Hamroff LLP; Steven S. Rubin, Esq.

(57) ABSTRACT

A system and method for generating a keyword ranking report. A processor is effective to receive a set of keywords and URLs. The processor may send the keywords to a search engine and receive first and second ranked result sets. The processor may filter the first and second ranked result sets based on the URLs to produce filtered result sets. The processor may generate a report based on the keywords and the filtered result sets.

9 Claims, 5 Drawing Sheets

| Keyword(s) | Monthly search volume | Aggregated URL for Company A (e.g. A.com) | Aggregated URL for Company B (e.g. B.com) | Aggregated URL for Company C (e.g. C.com) |
|---|---|---|---|---|
| crm | 50,000 | 3 | 18 | 94 |
| crm software | 25,000 | 2 | 17 | 92 |
| crm solution | 2,000 | 1 | 12 | 39 |
| crm system | 1,000 | 2 | 1 | 21 |
| crm tool | 1,000 | 100 | 18 | 5 |
| ... | ... | ... | ... | ... |
| Average Ranking | | 13.82 | 41.77 | 42.00 |
| Top 10 Rankings | | 17 | 3 | 5 |
| Top 5 Rankings | | 16 | 1 | 3 |
| #1 Rankings | | 3 | 1 | 1 |

| Keyword(s) | Monthly search volume | Aggregated URL for Company A (e.g. A.com) | Aggregated URL for Company B (e.g. B.com) | Aggregated URL for Company C (e.g. C.com) |
|---|---|---|---|---|
| crm | 50,000 | 3 | 18 | 94 |
| crm software | 25,000 | 2 | 17 | 92 |
| crm solution | 2,000 | 1 | 12 | 39 |
| crm system | 1,000 | 2 | 1 | 21 |
| crm tool | 1,000 | 100 | 18 | 5 |
| ... | | ... | ... | ... |
| Average Ranking | | 13.82 | 41.77 | 42.00 |
| Top 10 Rankings | | 17 | 3 | 5 |
| Top 5 Rankings | | 16 | 1 | 3 |
| #1 Rankings | | 3 | 1 | 1 |

SYSTEM FOR GENERATING A KEYWORD RANKING REPORT

BACKGROUND OF THE INVENTION

1. Field of the Invention

This disclosure relates to a system and method for generating a keyword ranking report indicating how a plurality of competing web pages may be ranked by a search engine for a plurality of keywords.

2. Description of the Related Art

Referring to FIG. 1, the World Wide Web ("WWW") is a distributed database including literally billions of pages accessible through the Internet. Searching and indexing these pages to produce useful results in response to user queries is constantly a challenge. A search engine is typically used to search the WWW.

A typical prior art search engine 20 is shown in FIG. 1. Pages from the Internet or other source 22 are accessed through the use of a crawler 24. Crawler 24 aggregates pages from source 22 to ensure that these pages are searchable. Many algorithms exist for crawlers and in most cases these crawlers follow links in known hypertext documents to obtain other documents. The pages retrieved by crawler 24 are stored in a database 36. Thereafter, these pages are indexed by an indexer 26. Indexer 26 builds a searchable index of the pages in a database 34. For example, each web page may be broken down into words and respective locations of each word on the page. The pages are then indexed by the words and their respective locations.

In use, a user 32 uses a processor 38 to send a search query to a dispatcher 30. Dispatcher 30 compiles a list of search nodes in cluster 28 to execute the query and forwards the query to those selected search nodes. The search nodes in search node cluster 28 search respective parts of the index 34 and return search results along with a document identifier to dispatcher 30. Dispatcher 30 merges the received results to produce a final result set displayed to user 32 sorted by ranking scores based on a ranking function. This disclosure describes an improvement over these prior art technologies.

SUMMARY OF THE INVENTION

One embodiment of the invention is a method for generating a keyword ranking report. The method comprises receiving a first keyword by a processor; receiving a second keyword by the processor; receiving a first URL by the processor; receiving a second URL by the processor; and sending the first keyword from the processor to a search engine. The method further comprises receiving a first ranked result set for the first keyword from the search engine by the processor; sending the second keyword from the processor to the search engine; and receiving a second ranked result set for the second keyword from the search engine by the processor. The method further comprises filtering, by the processor, the first and second ranked result sets based on the first and second URL to produce filtered result sets; and generating, by the processor, a report based on the first keyword, the second keyword and the filtered result sets.

Another embodiment of the invention is a system for generating a keyword ranking report. The system comprises a memory; and a processor in communication with the memory. The processor is effective to receive a first keyword; receive a second keyword; receive a first URL; receive a second URL; and send the first keyword to a search engine. The processor is further effective to receive a first ranked result set for the first keyword from the search engine; send the second keyword to the search engine; receive a second ranked result set for the second keyword from the search engine; filter the first and second ranked result sets based on the first and second URL to produce filtered result sets; generate a report based on the first keyword, the second keyword and the filtered result sets; and store the report in the memory.

Yet another embodiment of the invention is a display comprising a first row/column including a first keyword and a second keyword. The display further comprises a second row/column including a first indication of a first rank for a first URL by a search engine for the first keyword; and a second indication of a second rank for the first URL by the search engine for the second keyword. The display further comprises a third row/column including a third indication of a third rank for a second URL by the search engine for the first keyword; and a fourth indication of a fourth rank for the second URL by the search engine for the second keyword.

BRIEF DESCRIPTION OF THE FIGURES

The foregoing and other features of this disclosure will become more fully apparent from the following description and appended claims taken in conjunction with the accompanying drawings. Understanding that these drawings depict only some embodiments in accordance with the disclosure and are therefore not to be considered limiting of its scope, the disclosure will be described with additional specificity and detail by reference to the accompanying drawings in which:

FIG. 4 is a diagram illustrating a report that could be produced in accordance with an embodiment of the invention.

DETAILED DESCRIPTION OF THE PREFERRED EMBODIMENT(S)

Figure 1:
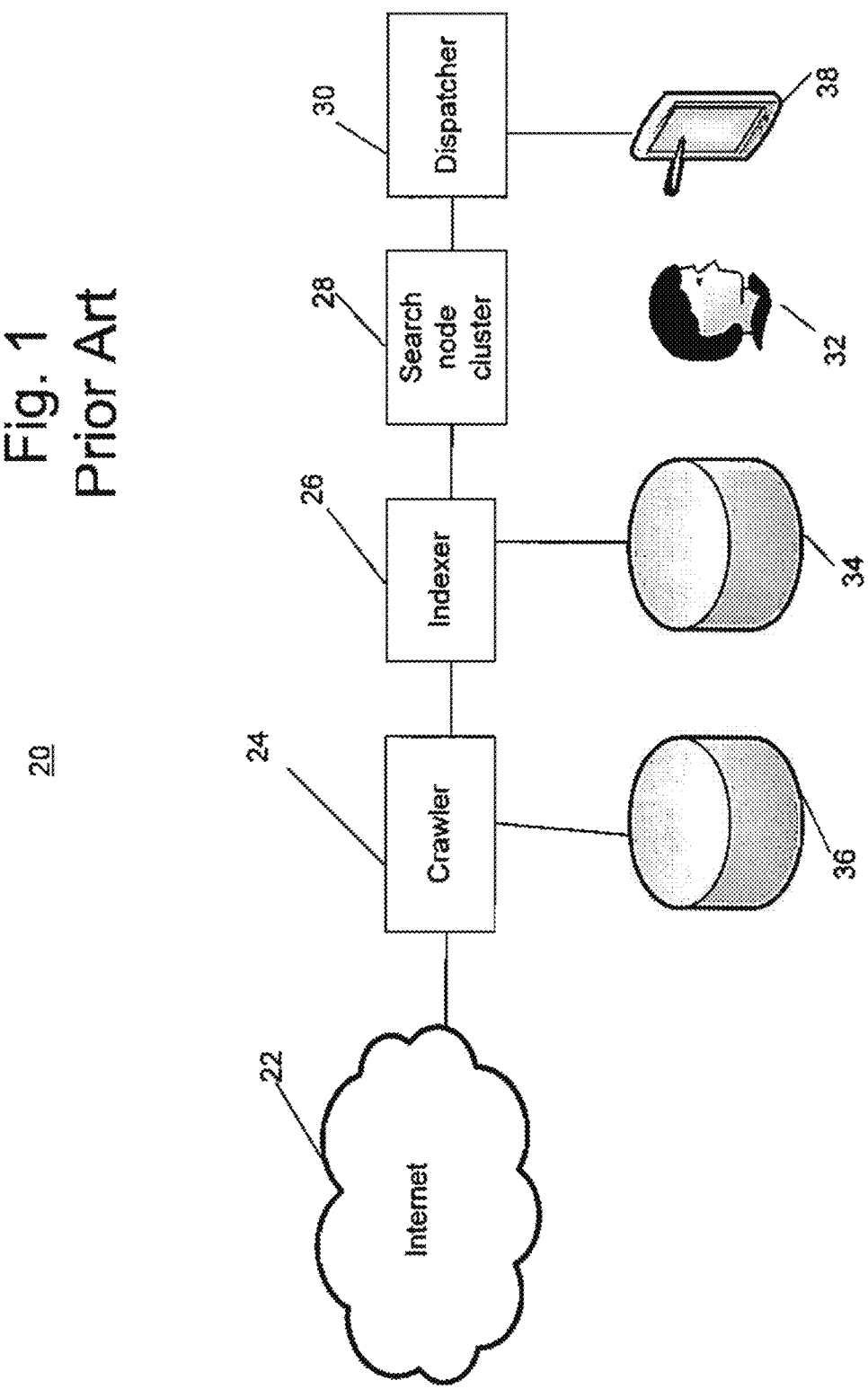
FIG. 1 is a system drawing of a search engine in accordance with the prior art.

In the following detailed description, reference is made to the accompanying drawings which form a part thereof. In the drawings, similar symbols typically identify similar components unless context indicates otherwise. The illustrative embodiments described in the detailed description, drawings and claims are not meant to be limiting. Other embodiments may be utilized and other changes may be made without departing from the spirit or scope of the subject matter presented herein. It will be readily understood that the aspects of the present disclosure as generally described herein and as illustrated in the accompanying figures can be arranged, substituted, combined, separated and/or designed in a wide variety of different configurations all of which are explicitly contemplated herein.

Figure 2:
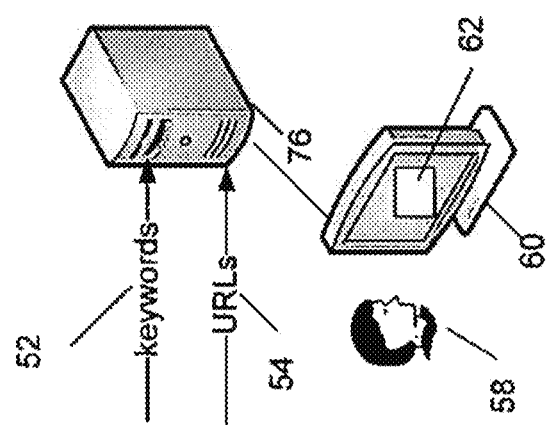
FIG. 2 is a system drawing of a system in accordance with an embodiment of the invention.

Referring to FIG. 2, there is shown a system 50 in accordance with an embodiment of the invention. As is described in more detail below, a user 58 may provide a set of keywords 52 and a set of URLs (uniform resource locator) 54 to a processor 76. Each keyword 52 could be, for example, one or more characters, symbols and/or words. Processor 76 receives set of keywords 52 and URLs 54 and generates a report 62 indicating how the URLs rank in a result set generated by a search engine for set of keywords 52. Report 62 may be displayed to user 58 on a display 60.

Figure 3:
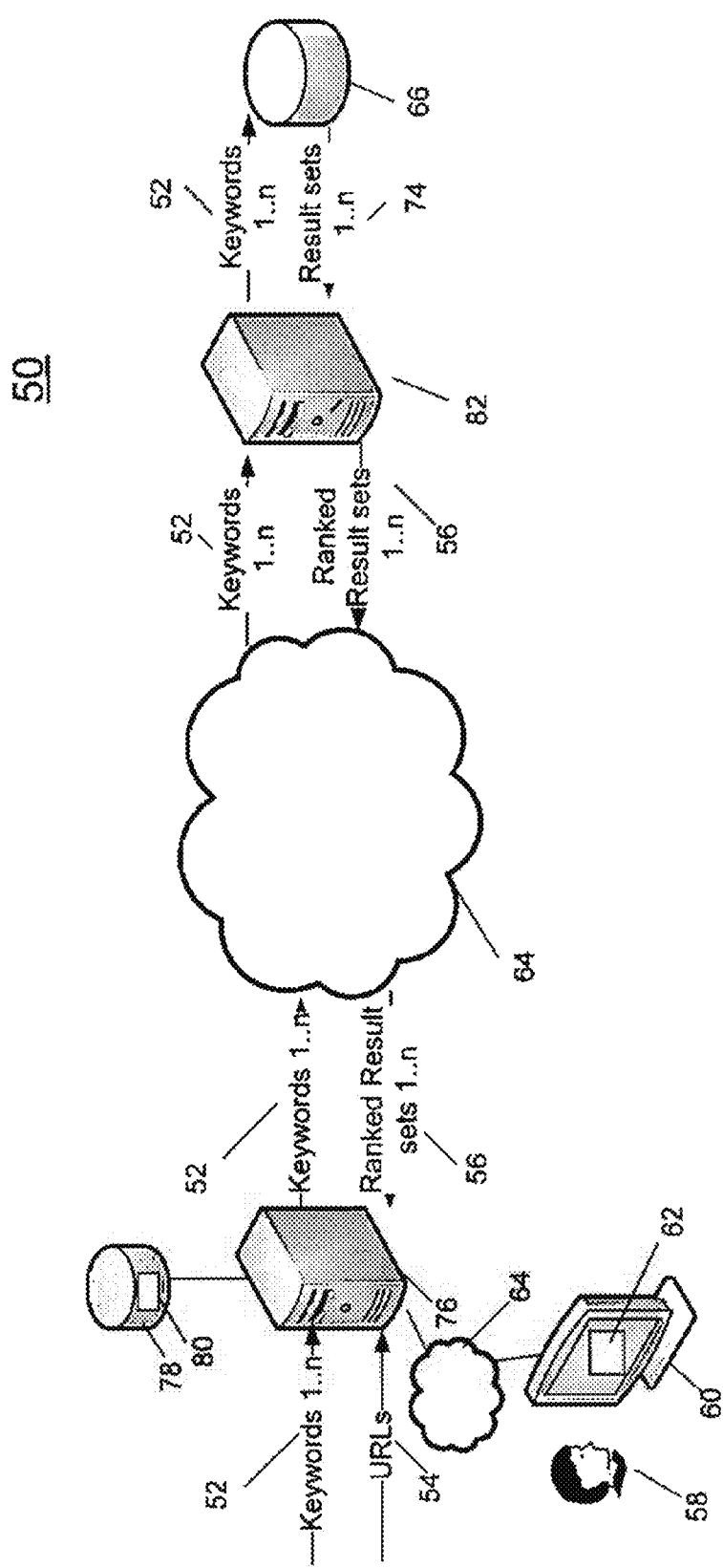
FIG. 3 is a system drawing of a system in accordance with an embodiment of the invention.

Referring to FIG. 3, there is shown more detail of system 50. As shown, processor 76 may be in communication with user 58 and display 60 over a network 64 such as the Internet network. Processor 76 may further be in communication with a memory 78 including instructions 80 and with a search engine 82 over network 64.

Processor 76 may receive set of keywords 52 (n keywords are shown) and URLs 54 from user 58. Set of keywords 52 could include, for example, keywords relevant to a business and/or web site owned by user 58. For example, set of keywords 52 could be a set of the 25 most popular keywords relating to a business of user 58. A monthly search volume of a particular search engine 82 could be used to help generate set of keywords 52.

URLs 54 may include a set of URLs relating to web sites owned by user 58 and a set of URLs relating to web sites owned by competitors of user 58. Based on result sets produced by a search engine for keywords 52, processor 76 may recommend additional URLs 54 appearing in the result sets. For example, if user 58 owns company A, user 58 may send URLs 54 to processor 76 including A.com, AA.com, etc. (if company A owns those URLs). Similarly, user 58 may send URLs 54 to processor 76 relating to competitor B including B.com and BB.com.

Processor 76 may process URLs 54 so that similarly structured URLs may be aggregated. For example, using instructions 80, processor 76 may truncate portions of URLs 54 such as the scheme name (e.g. http, ftp, etc.), truncate top level domain (e.g. .com; .edu; etc.), truncate "www", truncate characters appearing in the URL after the top level domain, and/or truncate characters appearing two periods/delimiters prior to the top level domain (e.g. removing "sales" in sales.A.com), etc. All URLs 54 with the same resultant characters after the truncation may be aggregated together and considered as a single URL by processor 76.

Processor 76 may send each keyword in set of keywords 52 over network 64 to search engine 82. Search engine 82 could be, for example, the GOOGLE search engine, the YAHOO! search engine, the BING search engine, etc. Search engine 82 may receive each keyword in set of keywords 52. For each keyword in set of keywords 52, search engine 82 may search index 66 for web pages and URLs that may include keywords 52. For each keyword in set of keywords 52, search engine 82 may receive result sets 74 listing web pages and URLs that include keywords 52. Search engine 82 may then rank each of the URLs in the result sets 74 in order to produce ranked result sets 56 and send ranked result sets 56 over internet 64 to processor 76.

Processor 76 may receive ranked result sets 56 and filter ranked result sets 56 based on URLs 54 or aggregated URLs to generate filtered result sets for report 62 to be stored in memory 78 and displayed on display 60. Report 62 may be based on a single search engine 82 and/or may include results from multiple search engines. For example, referring now also to FIG. 4, report 62 may include a table 100. Table 100 may include fields in a plurality of rows/columns such as Keyword(s) 102, Monthly Search Volume 104, Aggregated URL for Company A 106, Aggregated URL for Company B 108, Aggregated URL for Company C, Average Ranking 112, Top 10 Rankings 114, Top 5 Rankings 116, #1 Rankings 118, etc. Fields and rows/columns can be added or removed from table 100. An aggregated URL for a company may be generated by aggregating URLs 54 as discussed above. In the examples discussed above, "A.com" may be an aggregated URL and could populate the field defining row/column Aggregated URL for Company A 106.

Data in fields in keyword row/column 102 could include set of keywords 52 requested by user 58. Focusing on, for example, row/column 120, for keyword "crm" in set of keywords 52, table 100 includes an indication of a monthly search volume of 50,000. This may mean that keyword "crm" was entered as a query by users of the pertinent search engine 50,000 times during a month. A tool from GOOGLE could be used to determine monthly search volume. For keyword "crm", table 100 indicates that the Aggregated URL for Company A ranked number 3 in ranked result sets 56 by search engine 82. Similarly, for keyword "crm" table 100 indicates that Aggregated URL for Company B ranked number 18 and Aggregated URL for Company C ranked number 94 in ranked result sets 56 by search engine 82. Ranking of aggregated URLs for other keywords in set of keywords 52 are shown in table 100.

Data in Average Ranking row/column 112 indicates an average rank in ranked result sets 56 for a particular URL/aggregated URL for all keywords in set of keywords 52. Similarly, data in fields of Top 10 Rankings row/column 114, Top 5 Rankings row/column 116 and #1 Rankings row/column 118 respectively indicate how often a particular URL/aggregated URL ranked in the top 10, 5 and 1 place(s) in ranked result sets 56.

Among other benefits, system 50 and report 100 provide visibility to a competitive space for a set of keywords. Prior art techniques are significantly manually intensive and generally cannot provide the same analytics or perspectives for a user. For example, a company can use system 50 to learn that its web page averages a particular rank in a result set from a search engine for many different pertinent keywords. Using system 50, a company can determine how well their web site is doing and can compare that performance with web sites owned by competitors. A company can use system 50 to learn about placement in ranked result sets of a new competitor's web page or URL. For example, a web site owned by a new competitor may rank lower than in a top 100 results and thereby be quite difficult to find without system 50.

Figure 5:
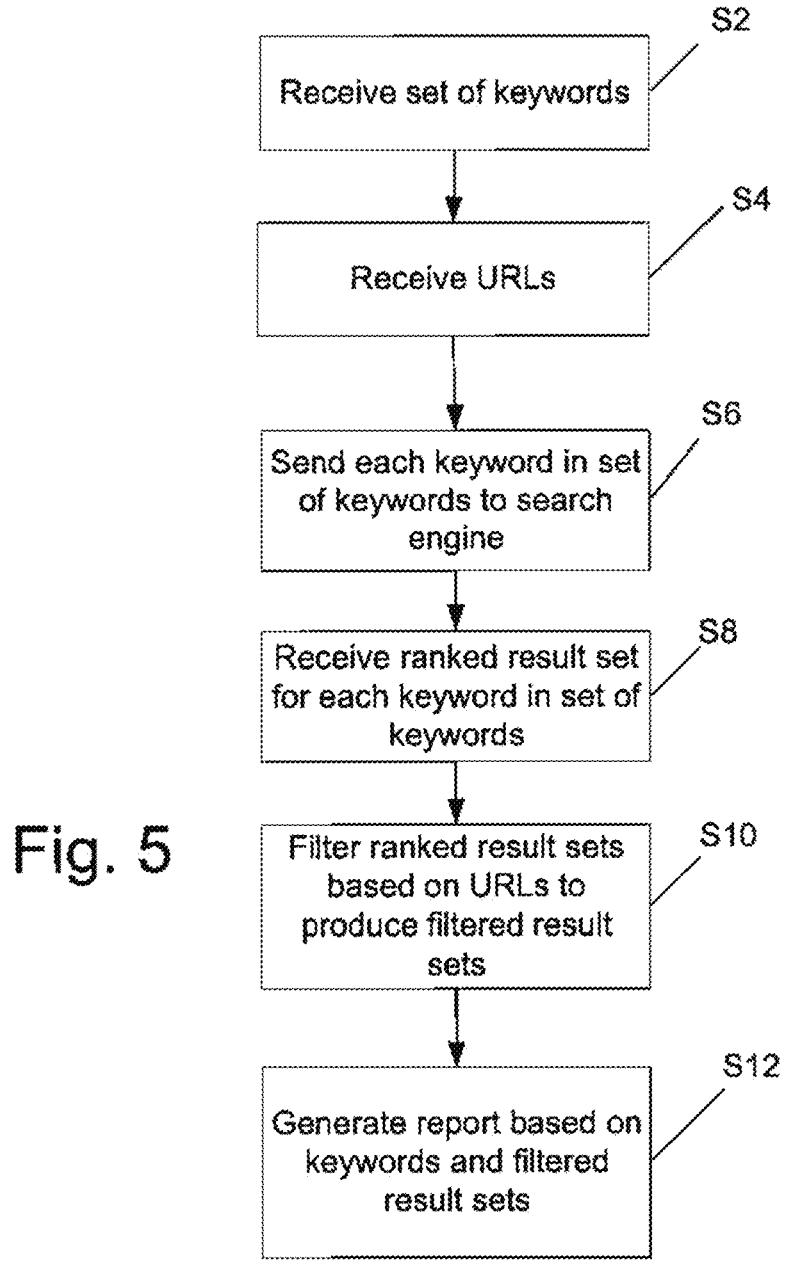
FIG. 5 is a flow chart illustrating a process which could be performed in a accordance with an embodiment of the invention.

Referring to FIG. 5, there is shown a process which could be performed in accordance with an embodiment of the invention. The process could be performed using, for example, system 50 discussed above. As show, at a step S2, a processor may receive a set of keywords. At step S4, the processor may receive a plurality of URLs. The processor may aggregate some of the URLs by performing truncation on the URLs.

At step S6, the processor may send each keyword in the set of keywords to a search engine. At step S8, the processor may receive a ranked result set for each keyword in the set of keywords. At step S10, the processor may filter the ranked results based on the URLs to produce filtered result sets. At step S12, the processor may generate a report based on the keywords and the filtered result sets.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for generating a keyword ranking report, the method comprising:

receiving a first keyword by a processor;

receiving a second keyword by the processor;

receiving a first uniform resource locator (URL) by the processor, wherein the first URL comprises a plurality of first URLs;

aggregating the plurality of first URLs to produce an aggregated URL by the processor;
receiving a second URL by the processor;
sending the first keyword from the processor to a search engine;
receiving a first ranked result set for the first keyword from the search engine by the processor;
sending the second keyword from the processor to the search engine;
receiving a second ranked result set for the second keyword from the search engine by the processor;
filtering, by the processor, the first and second ranked result sets based on the aggregated URL and the second URL to produce filtered first and filtered second result sets;
determining, by the processor, a first average rank of the aggregated URL for the filtered first and filtered second result sets;
determining, by the processor, a second average rank of the second URL for the filtered first and filtered second result sets; and
generating, by the processor, a report to be displayed to a user, the report includes the first keyword, the second keyword, the aggregated URL, the second URL, the first average rank, the second average rank, and the report being based on the filtered first and filtered second sets.

2. The method as recited in claim 1, wherein the report includes an indication of a number of times the aggregated URL ranked in a defined number of places in the filtered first result set.

3. The method as recited in claim 1, wherein:
the report includes an indication of a rank of the aggregated URL by the search engine for the first keyword in the filtered first result set; and
the report includes an indication of a rank of the second URL by the search engine for the first keyword in the filtered first result set.

4. The method as recited in claim 3, wherein:
the report further includes an indication of a rank of the aggregated URL by the search engine for the second keyword in the filtered second result set; and
the report further includes an indication of a rank of the second URL by the search engine for the second keyword in the filtered second result set.

5. The method as recited in claim 1, wherein the report includes an indication of a monthly search volume for the first keyword.

6. A system for generating a keyword ranking report, the system comprising:
a memory;
a processor in communication with the memory, the processor effective to
receive a first keyword;
receive a second keyword;
receive a first uniform resource locator (URL), wherein the first URL comprises a plurality of first URLs;
aggregate the plurality of first URLs to produce an aggregated URL;
receive a second URL;
send the first keyword to a search engine;
receive a first ranked result set for the first keyword from the search engine;
send the second keyword to the search engine;
receive a second ranked result set for the second keyword from the search engine;
filter the first and second ranked result sets based on the aggregated URL and the second URL to produce filtered first and filtered second result sets;
determine a first average rank of the aggregated URL for the filtered first and filtered second result sets;
determine a second average rank of the second URL for the filtered first and filtered second result sets; and
generate a report that includes the first keyword, the second keyword, the aggregated URL, the second URL, the first average rank, the second average rank, and the report being based on the filtered first and filtered second sets; and
causing the report to be displayed on a display.

7. The system as recited in claim 6, wherein the report includes an indication of a number of times the aggregated URL ranked in a defined number of places in the filtered first result set.

8. The system as recited in claim 6, wherein:
the report includes an indication of a rank of the aggregated URL by the search engine for the first keyword in the filtered first result set; and
the report includes an indication of a rank of the second URL by the search engine for the first keyword in the filtered first result set.

9. The system as recited in claim 8, wherein:
the report further includes an indication of a rank of the aggregated URL by the search engine for the second keyword in the filtered second result set; and
the report includes an indication of a rank of the second URL by the search engine for the second keyword in the filtered second result set.

* * * * *